United States Patent
Ueda et al.

[11] Patent Number: 6,069,667
[45] Date of Patent: May 30, 2000

[54] SYNCHRONIZING SIGNAL DETECTING DEVICE

[75] Inventors: Kazuya Ueda, Suita; Takaaki Konishi, Ibaraki, both of Japan

[73] Assignee: Matsushita Electric Industrial Co., Ltd., Osaka, Japan

[21] Appl. No.: 09/171,079

[22] PCT Filed: Feb. 10, 1998

[86] PCT No.: PCT/JP98/00538

§ 371 Date: Oct. 13, 1998

§ 102(e) Date: Oct. 13, 1998

[87] PCT Pub. No.: WO98/36558

PCT Pub. Date: Aug. 20, 1998

[30] Foreign Application Priority Data

Feb. 12, 1997 [JP] Japan ................................ 9-027618

[51] Int. Cl.[7] .............. H04N 5/08; H04N 5/10; H04L 7/00
[52] U.S. Cl. .............. 348/525; 348/525; 348/530; 348/531; 348/533; 375/368; 375/365; 375/366
[58] Field of Search .................... 348/194, 525, 348/529, 530, 531, 533; 375/368, 365, 366; 370/514, 512, 509

[56] References Cited

U.S. PATENT DOCUMENTS

| | | | |
|---|---|---|---|
| 4,864,556 | 9/1989 | Chopping et al. | 370/16 |
| 5,123,013 | 6/1992 | Hirayama | 370/105.4 |
| 5,267,267 | 11/1993 | Kazawa et al. | 375/20 |
| 5,619,509 | 4/1997 | Maruyama et al. | 371/5.4 |
| 5,677,935 | 10/1997 | Karino | 375/368 |
| 5,778,214 | 7/1998 | Taya et al. | 395/551 |
| 5,786,870 | 7/1998 | Limberg | 348/607 |
| 5,995,307 | 11/1999 | Kang | 360/51 |
| 6,014,276 | 1/2000 | Takase | 360/49 |

FOREIGN PATENT DOCUMENTS

| | | |
|---|---|---|
| 5-83590 | 4/1993 | Japan . |
| 5-236295 | 9/1993 | Japan . |
| 6-177871 | 6/1994 | Japan . |
| 6-291757 | 10/1994 | Japan . |
| 8-214184 | 8/1996 | Japan . |

OTHER PUBLICATIONS

Search report corresponding to application No. PCT/JP98/00538 dated Apr. 21, 1998.
English translation of Form PCT/ISA/210.

*Primary Examiner*—John K. Peng
*Assistant Examiner*—Paulos Natnael
*Attorney, Agent, or Firm*—Ratner & Prestia

[57] ABSTRACT

In a Sync signal detection circuit for detecting a Sync signal included in a television signal transmitted in a digital mode, pattern check means 2 checks a pattern of a Sync signal which is super imposed on a series of input data with a reference pattern. Based on a check result, Sync detection determination means 5 outputs a Sync detected signal or a Sync non-detected signal. Sync detection initialization means is further provided to this detection circuit for outputting forcibly a Sync non-detected signal when a signal of a series of input data is switched over. As a result, a Sync signal can be detected within a shorter period than the conventional circuit structure.

2 Claims, 12 Drawing Sheets

SYNCHRONIZING SIGNAL DETECTING DEVICE

This application is a U.S. National Phase Application of PCT International application PCT/JP98/00538.

TECHNICAL FIELD OF THE INVENTION

The present invention relates to a synchronizing signal detecting device for detecting synchronizing signals in digital broadcasting transmission such as digital CATV (cable television), communication satellite (CS) digital broadcasting and the like.

BACKGROUND ART

In digital-signal-transmission including digital CATV, CS digital broadcasting and the like, synchronizing signals, error-correcting codes, etc. are added to signals at the transmission side before the signals are transmitted. The synchronizing signal (hereinafter called "Sync signal"), among others, is essential for restoring the signals on a receiver side.

Figure 7:
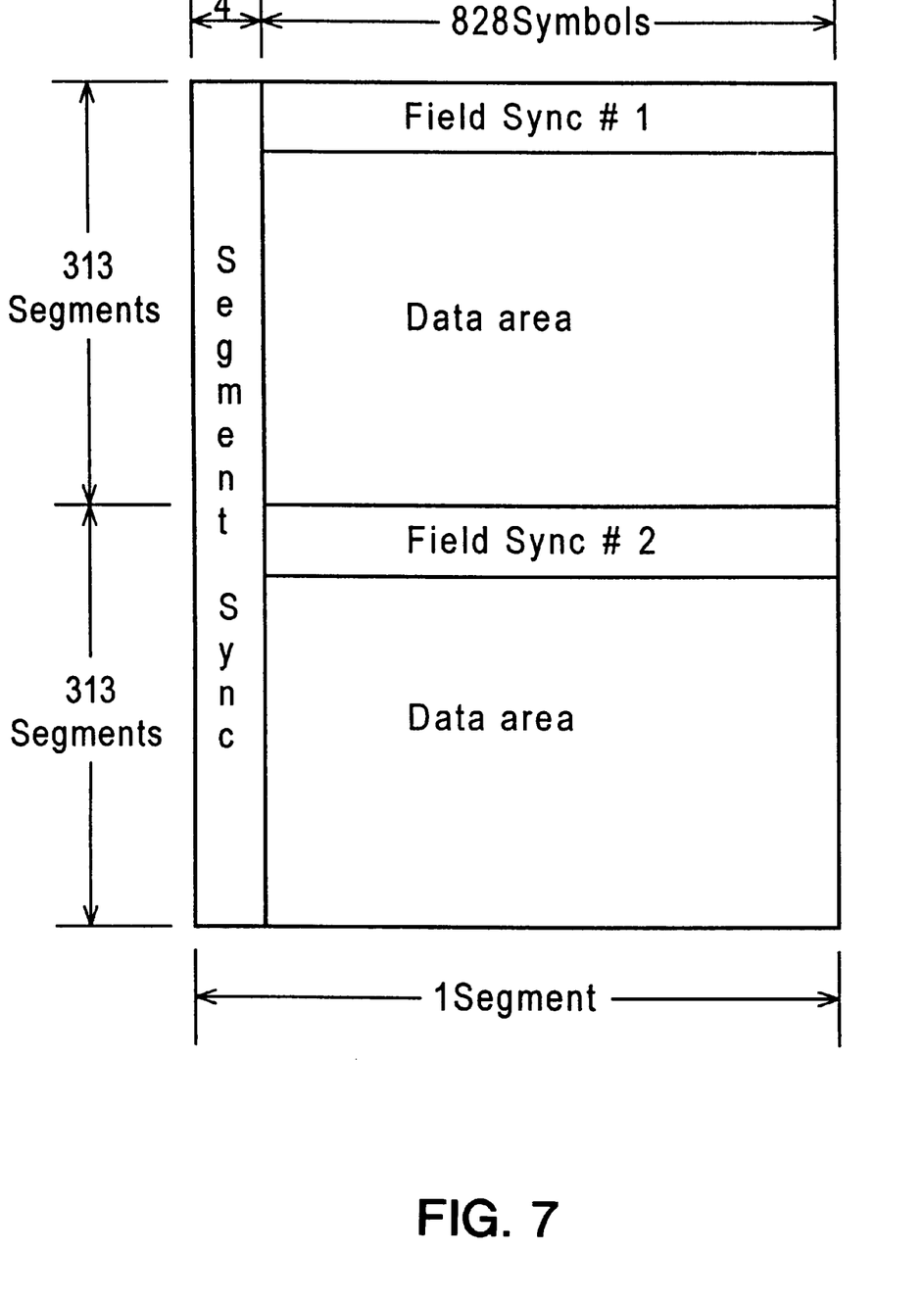
FIG. 7 depicts VSB transmission format utilized in ATV system.
Figure 8:
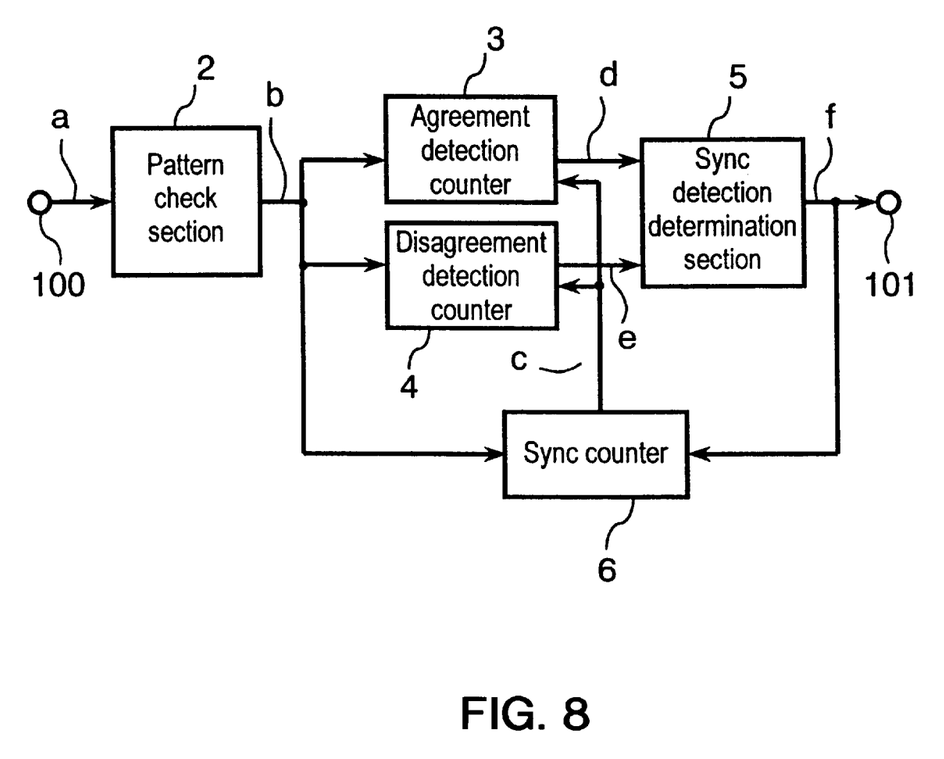
FIG. 8 is a block diagram depicting a conventional Sync signal detection circuit.

FIG. 7 depicts a format depicting a transmission sequence and placement of signal data in vestigial side band (VSB) transmission employed in the Advanced Television (ATV) in the U.S. A circuit for detecting this Sync signal (a segment Sync signal in this case) in digital signal transmission such as VSB transmission is illustrated as a prior art in FIG. 8. In the meantime, an interval between the adjacent Sync signals in FIG. 7 corresponds to 832 symbols.

In FIG. 8, the digital signals transmitted in the format of the VSB transmission are fed into an input terminal 100. The Sync signal included in this input digital signal "a" undergoes a pattern check section 2 where the Sync signal is checked whether its pattern is matched with the reference pattern of the synchronizing signal. In other words, this pattern check section 2 checks a signal pattern included in the segment Sync signal (corresponding to 4 symbols) with the predetermined reference pattern (corresponding to 4 symbols), and when they agree with each other, the pattern check section 2 outputs a high level signal "b". This output signal from the pattern check section 2 is fed into an agreement detection counter 3, disagreement detection counter 4 and Sync counter 6.

The agreement detection counter 3 counts how many signal patterns agree with the reference pattern in the pattern check section 2. In other words, when a timing signal "c" from the Sync counter 6 is fed into the agreement detection counter 3, which counts up one by one provided the output signal "b" from the pattern check section 2 is on a high level. When the count value reaches to "3", the counter 3 does not count up any more and stays at "3" even if the output signal "b" is at the high level. When the output signal "c" is fed into the counter 3, which is reset to "0" provided the output signal "b" from the pattern check section 2 is at a low level.

When the disagreement detection counter 4 receives the timing signal "c" from the Sync counter 6, it counts up one by one provided the output signal "b" from the pattern check section 2 is at the low level. When the counted value reaches to "3", the counter 4 does not count up any more and stays at "3" even if the output signal "b" is at the low level. When the output signal "c" is fed into the counter 4, the counter is reset to "0" provided the output signal "b" from the pattern check section 2 is at the high level.

A Sync detection determination section 5 determines a Sync detection based on the output signals from the counters 3 and 4. Namely, it outputs a high level signal "f" indicating a Sync detected status just when an output signal "e" from the counter 4 is changed to "0" while an output signal "d" from the counter 3 stays at "3". On the other hand, it outputs a low level signal "f" indicating a Sync non-detected status just when the output signal "e" from the counter 4 changes to "3" while the output signal "d" from the counter 3 is "0".

A necessary number of input Sync signals can be changed by resetting the count set values of the counters 3 and 4 as well as the set value of the Sync detection determination section 5.

The Sync counter 6 outputs a signal "c" that controls timings of the count operations of the counters 3 and 4 by using the output signal "b" from the pattern check section 2 and the output signal "f" from the Sync detection determination section 5. Namely, the Sync counter 6 starts counting whenever it receives the output signal "b", when the output signal "f" is on a low level indicating the Sync non-detected status, and the counter 6 outputs the timing signals "c" for a period of 4 symbols every time after a lapse of the period corresponding to one segment (equal to 832 symbols.)

When the output signal "f" is on a high level indicating the Sync detected status, the Sync counter 6 starts counting just when the output signal "f" changes to the high level, and then outputs a high level timing signals "c" for the period of 4 symbols every time after the lapse of the period corresponding to one segment (equal to 832 symbols.) While, when the output signal "f" is on a low level, the Sync counter 6 does not output the timing signal "c" as long as the one segment period is still active, even the output signal "b" is given before the period of one segment is lapsed.

An operation of the Sync signal detection circuit is described hereinafter by referring to the timing charts in FIGS. 9 and 10.

Figure 9:
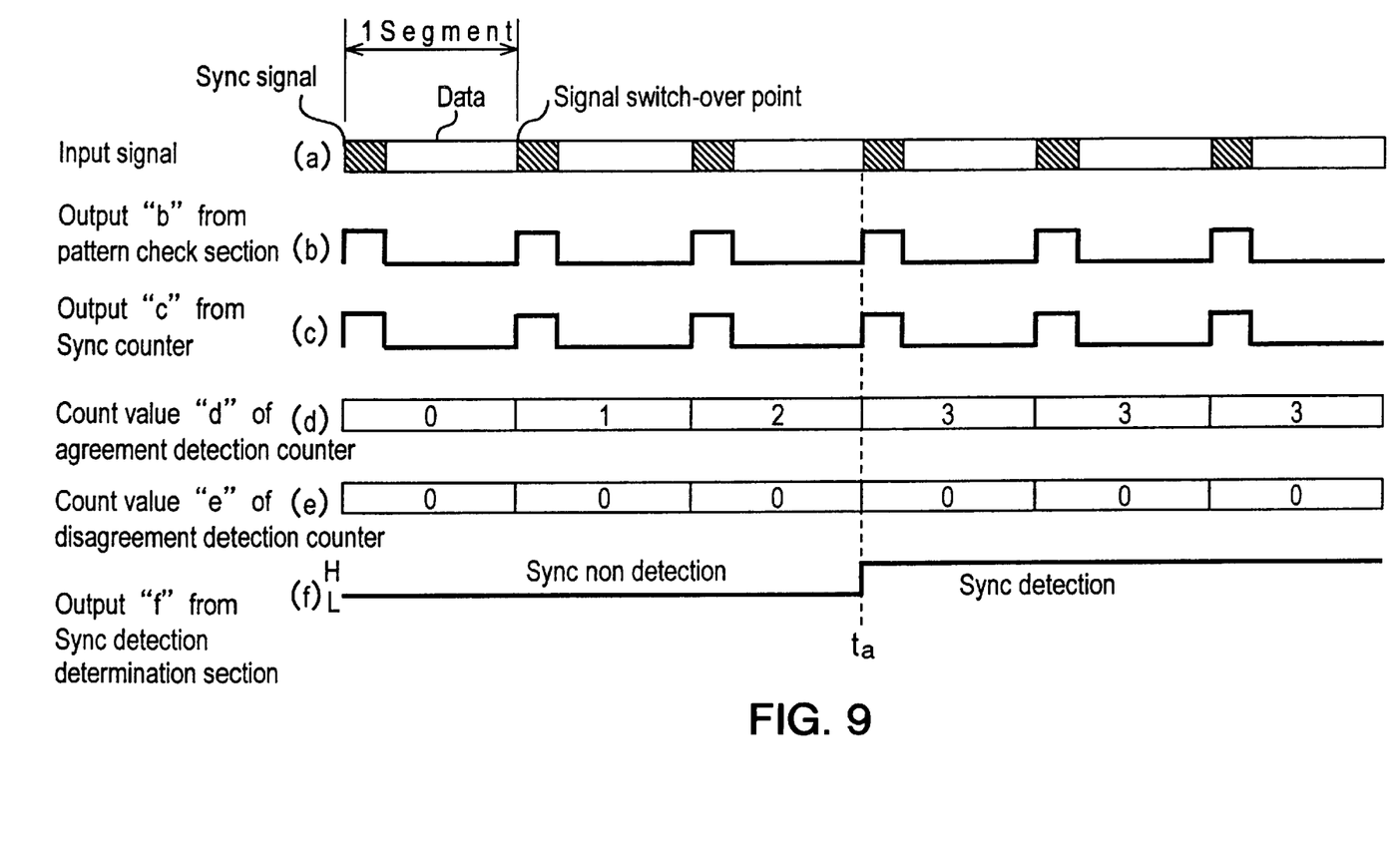
FIG. 9 is a timing chart depicting an operation of the Sync signal detection circuit shown in FIG. 8.

FIG. 9 depicts an initial stage where a digital signal is just fed through the input terminal 100. A digital signal "a" (equal to an input signal (a) in FIG. 9) fed into the input terminal 100 shown in FIG. 8 is firstly sent to the pattern check section 2. The pattern check section 2 detects a place where the pattern of the segment Sync signal shown in FIG. 7 exists, and outputs the high level signals "b" [equal to (b) in FIG. 9] indicating a pattern agreement as well as corresponding to 4 symbols to the agreement detection counter 3, disagreement detection counter 4 and Sync counter 6 when the pattern of the segment Sync signal agrees with the reference pattern.

The above counters 3 and 4 count responding to the output signals "b" and the timing signals "c", and then output resulting signals "d" and "e" (equal to (d) and (e) in FIG. 9) to the Sync detection determination section 5.

In the case of FIG. 9, when the counter 3 receives the timing signal "c", the output signal "b" from the pattern check section 2 is on a high level, the counter 3 thus counts up by one; however, when the count value reaches to "3", the counter does not count up any more and keeps "3" (refer to (d) in FIG. 9).

On the other hand, when the counter 4 receives the output signal "c" from the Sync counter 6, the counter 4 is reset to "0" provided the output signal "b" stays at the high level [refer to (e) in FIG. 9].

The Sync detection determination section 5 determines a detection of a Sync signal by using the count values given from the counters 3 and 4. Namely, the section 5 shown in FIG. 8 outputs a high level signal "f" (refer to (f) in FIG. 9) indicating the Sync. detected status just when (at the timing "ta") the output signal "e" from the counter 4 changes to "0" while the output signal "d" is "3".

As such, when the Sync. detection determination section 5 outputs a high level signal "f" that indicates a status of detecting a Sync signal, a data area shown in FIG. 7 is correctly located. The data included in this data area thus undergo various processes in data process circuit (not shown in FIG. 8) afterward.

In the case shown in FIG. 9, the Sync counter 6 outputs high level timing signals "c" to the counters 3 and 4 for the period of 4 symbols every time after a lapse of the period corresponding to one segment (equal to 832 symbols) since the time at the point "ta" (refer to (f) in FIG. 9) when the output signal "f" changes from the low level (Sync. non-detected status) to the high level (Sync. detected status).

Figure 10:
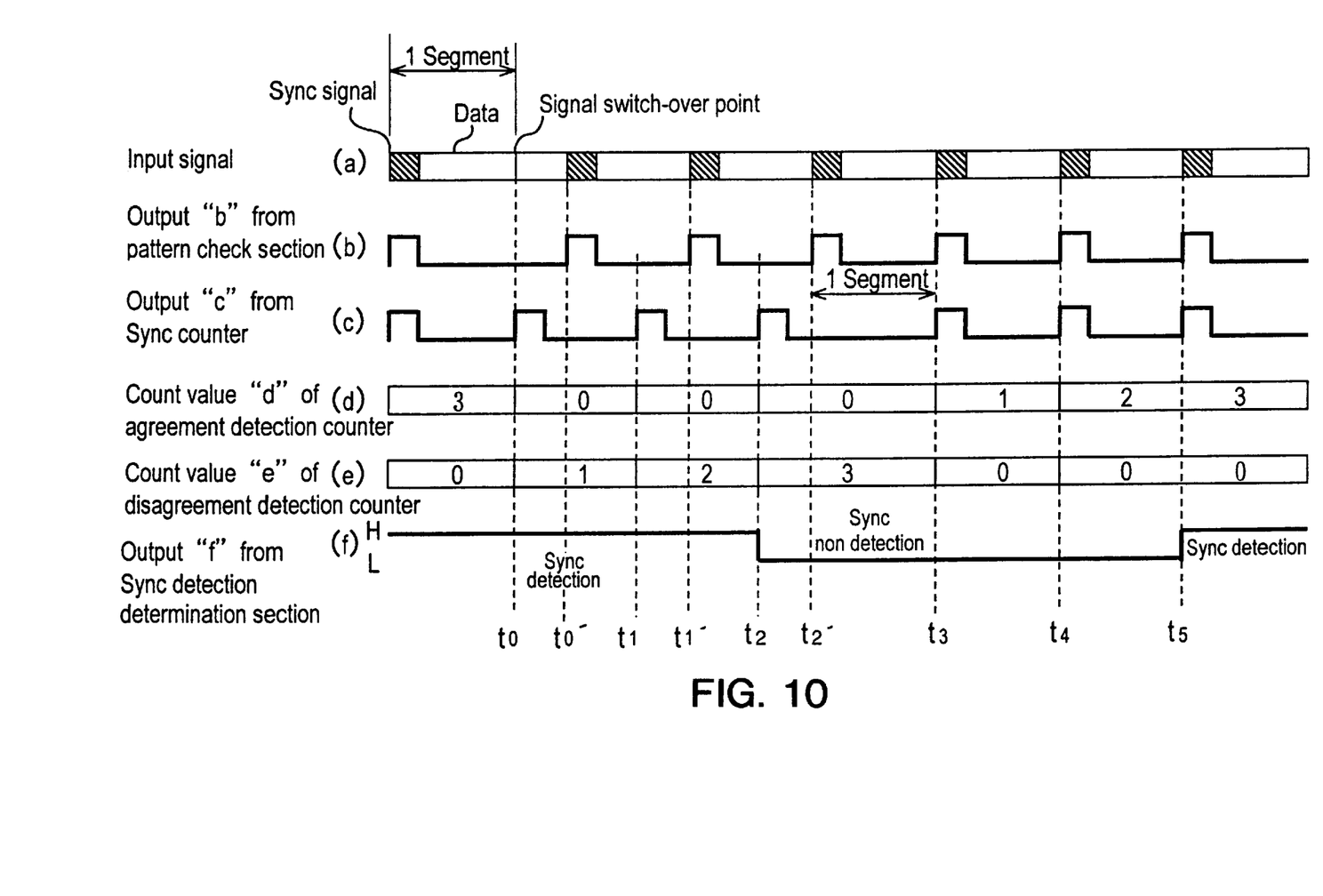
FIG. 10 is a timing chart depicting a detecting operation of the Sync signal detection circuit shown in FIG. 8.

FIG. 10 depicts a case where a digital signal is fed through the input terminal 100 (refer to FIG. 8), and another digital signal takes over the signal, though on the way, due to, e.g., switching a receiver (time: "t0". ) In this case, the Sync detected status is thus temporarily changed to the Sync non-detected status due to the switch-over. The determination section 5 afterward shows the Sync detected status again.

In other words, before the signal is switched over (before "t0" in FIG. 10), the determination section 5 outputs high level signals "f" indicating the "Sync detected status" (refer to (f) in FIG. 10). Since the time when the signal "f" has turned to the high level indicating the Sync detected status, the Sync counter 6 thus continuously outputs the high level timing signals "c" (refer to (c) in FIG. 10) for the period of 4 symbols every time after the lapse of one segment period (=832 symbols) to the counters 3 and 4. Under this condition, the count values of counters 3 and 4 are "3" and "0" respectively (refer to (d) and (e) in FIG. 10.)

Based on this status, another input signal takes over the present input signal at the time "t0". The phases of both these input signals seldom coincide with each other, and rather they do not coincide in general, therefore, the output period of the signal "b" from the pattern check section 2 becomes longer or shorter than the one segment period (=832 symbols) (refer to (b) in FIG. 10.) The output signal "b" from the section 2 is, therefore, at a low level when the Sync counter 6 outputs the timing signal "c" (=t0). The agreement detection counter 3 is thus reset (refer to (d) in FIG. 10). On the other hand, the disagreement detection counter 4 counts up one by one every time when receiving the timing signal "c". When the count value reaches to "3", the counter 4 does not count up anymore and keeps the value at "3" (refer to (e) in FIG. 10.)

The Sync detection determination section 5 outputs the low level signal "f" indicating the Sync. non-detected status just when (time=t2) the output signal "e" from the counter 4 changes to "3" while the output signal "d" from the counter 3 is "0" (refer to (f) in FIG. 10.)

When the signal "f" changes from the high level to low level (i.e., from the Sync detected status to Sync. non-detected status), the Sync counter 6 outputs the high level timing signals "c" sequentially to the counters 3 and 4 for the period of 4 symbols every time after the lapse of one segment period (=832 symbols) from each rising point of the input signal "b" fed from the pattern check section 2. For instance, the timing signal "c" at the time=t3 is produced after one segment period (=832 symbols) of the output signal "b" produced at the time=t2' tapped off from the pattern check section 2, because the output signal "f" tapped off from the determination section 5 is on a low level (refer to (b) and (c) in FIG. 10).

In the Sync non-detected status, when the counters 3 and 4 receive the timing signals (c) tapped off from the Sync counter 6, the agreement counter 3 counts up by one if the output signal "b" is at a high level (time=t3) and the disagreement counter 4 is reset to "0". After this, the counter 3 counts up one by one at time=t4 and t5 (refer to (d) in FIG. 10.) When the count value of the counter 3 reaches to "3" while the output signal "e" from the counter 4 is "0" (time=t5), the determination section 5 outputs again the high level signal "f" indicating the Sync detected status.

As shown in FIG. 10, when a digital signal fed through the input terminal 100 is switched over, though on the way of transmission, to another input digital signal by switching a receiver, the segment Sync signal must be given twice (at the time=t0' and t1') until the Sync detected status is turned temporarily to the Sync non-detected status by this signal switch. Further, the segment Sync signal must be given in four times (time=t2', t3, t4 and t5) before the Sync non-detected status is restored to the Sync detected status. In other words, the segment Sync signal must be given in six times between switching the signal and restoring to the Sync detected status.

This arrangement gives a protective function to Sync signal detecting systems, for a lack of a Sync signal due to noises or a lack of data causes malfunction, and the same pattern as a Sync signal comes into a data area by chance also causes malfunction. This arrangement can thus prevent the malfunction.

Figure 11:
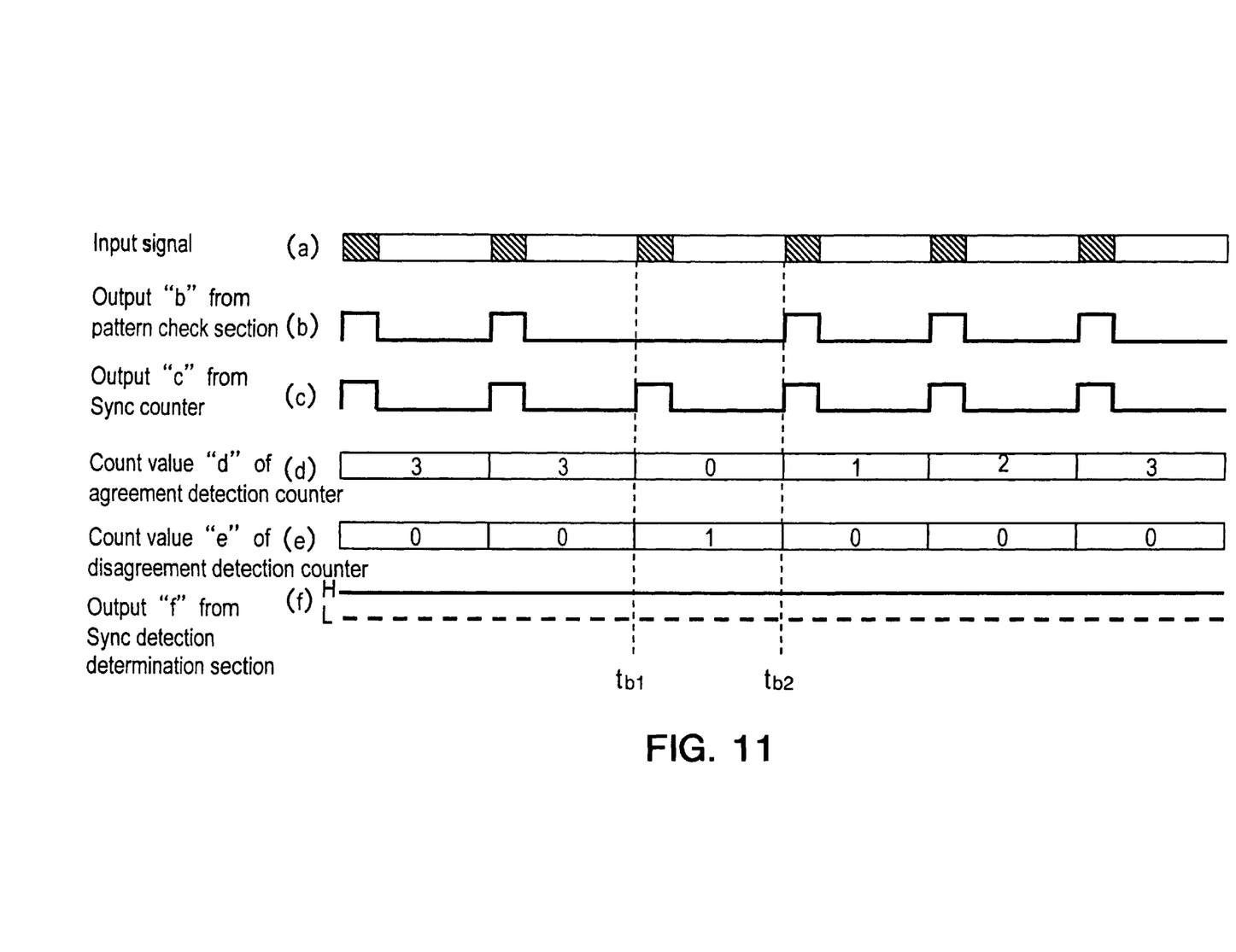
FIG. 11 is a timing chart depicting a preventive function against the malfunction of the Sync signal detection circuit shown in FIG. 8.
Figure 12:
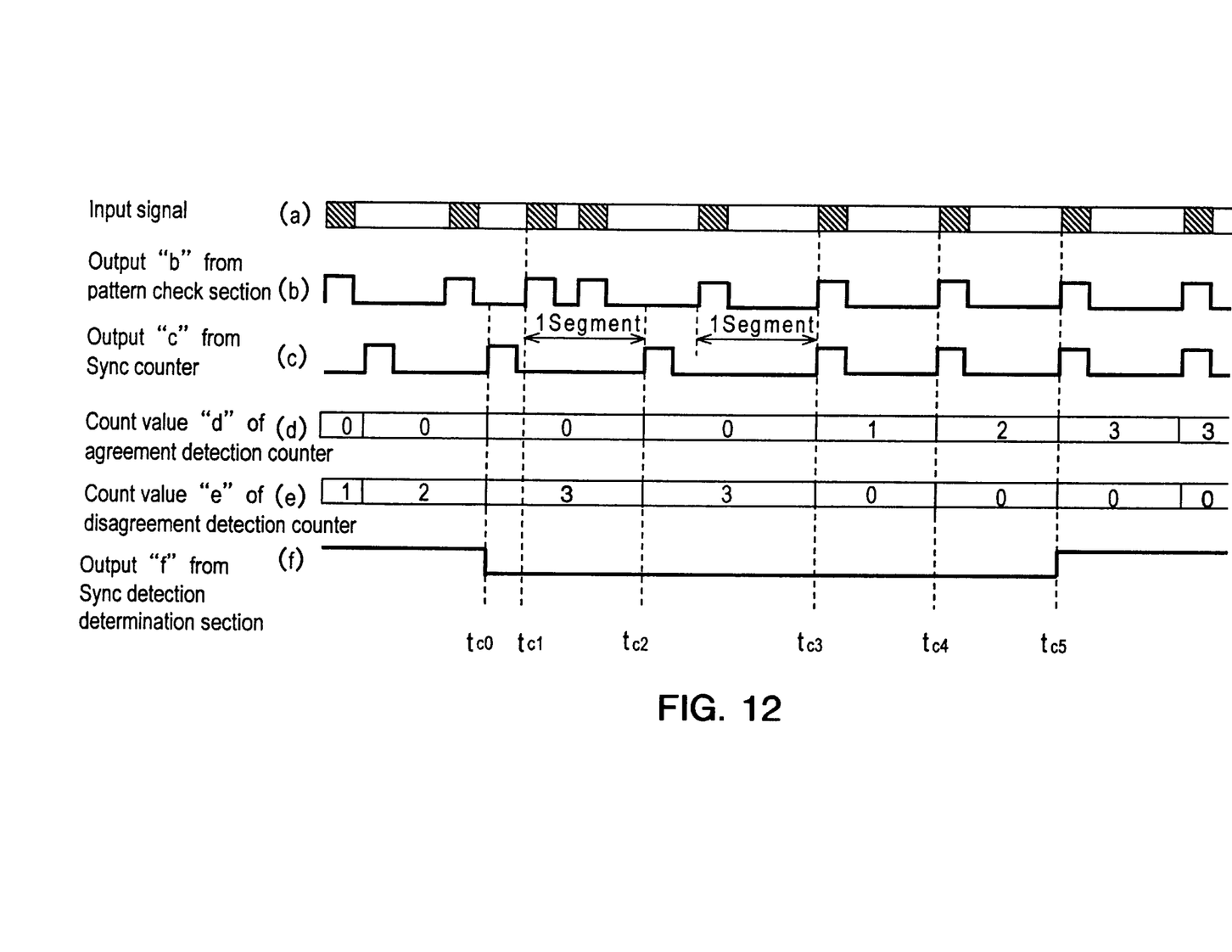
FIG. 12 is a timing chart depicting a preventive function against the malfunction of the Sync signal detection circuit shown in FIG. 8.

The above status is described by referring to the timing charts of FIGS. 11 and 12. FIG. 11 depicts a status where disturbance from outside such as noises deforms the pattern of a Sync signal included in an input signal "a" when the circuit is Sync detected status (=the agreement detection counter 3 indicates "3" and the disagreement detection counter 4 indicates "0" while the Sync detection determination section 5 outputs a high level signal "f" indicating the Sync detection status.)

At this time (=t b1), the pattern check section 2 does not output a high level signal pulse indicating a pattern agreement, and stays outputting a low level signal. In this case, when the Sync counter 6 outputs the timing signal "c", the agreement counter 3 is reset to "0", and the disagreement counter 4 indicates "1" on the other hand.

However, these disturbances such as noises and the like occur suddenly and do not last. Therefore, assume all the Sync signals given after the time=t b2 have the normal patterns, the pattern check section 2 would output the high level pulse signal "b" indicating the Sync detected status, the agreement counter 3 thus counts up one by one while the disagreement counter 4 is reset to "0".

Since the Sync detection determination section 5 outputs the low level signal indicating the Sync non-detected status under the condition that the counter 3 taps off the output signal "d" (=0) and the counter 4 taps off the output signal "e" (=3), the determination section 5 does not change immediately to the low level indicating the Sync non-detected status when the Sync signal is distorted temporarily, as shown in FIG. 11, due to the disturbance. Rather, the section 5 still holds the high level indicating the Sync detected status, thus the malfunction is prevented.

FIG. 12 depicts the following case; As shown in FIG. 10, a signal is switched over to another signal, and the counter 3 thus indicates "0" while the counter 4 indicates "3" (time=t c0). The section 5 is ready to output the low level signal indicating the Sync non-detected status. Then, a pattern same as that of the Sync signal abruptly appears in the data area at the time=t c1, .

At this time (=t c1), the pattern check section 2 outputs the high level signal "b" indicating the pattern agreement, and the Sync counter 6 outputs the timing signal "c" at the time=t c2 responding to the signal "b" after the lapse of one segment period (=832 symbols). Between t c1 and t c2, the section 2 supplies the signal "b" to the counter 6; however, the counter 6 neglects these signal "b" as described previously.

When the Sync counter 6 outputs the timing signal "c" at the time=t c2, the output signal "b" from the pattern check section 2 is at a low level. Although the agreement detection counter 3 indicates "0" while the disagreement detection counter 4 indicates "3", the Sync detection determination section 5 keeps outputting the low level signal "f" indicating the Sync non-detection status.

In other words, when a pattern same as that of the Sync signal appears abruptly in the data area, the determination section 5 does not indicate Sync detected status but stays at the low level indicating Sync non-detected status, thus the malfunction is prevented.

The conventional Sync signal detection circuit indeed prevents malfunctions against the lack of Sync signal due to noises and lack of data, as well as the same pattern as the Sync pattern appears in the data area by chance, but this preventive function works unconditionally even when an input signal is simply switched over as described above. Therefore, as shown in FIG. 10, the Sync signal must be given as many as 6 times from the signal switch-over until the Sync detected status is indicated again, which delays detecting a Sync signal.

DISCLOSURE OF THE INVENTION

The present invention addresses the above problem and aims to provide an improved Sync signal detection circuit which maintains the preventive function of the conventional circuit, and yet quickly detects the Sync signal when an input signal is switched over to another signal.

The Sync signal detection device of the present invention comprises the following elements in order to address the above problem:

(a) pattern check means for checking a pattern of Sync signal with a reference pattern, (b) agreement detection count means for counting a value of pattern agreements and outputting the count value as an output signal, (c) disagreement detection count means for counting a value of pattern disagreements and outputting the count value as an output signal, (d) Sync detection determination means for determining whether the Sync signal is detected or not based on the output signals from the agreement detection means and disagreement detection means, and outputting information about Sync detected status or Sync non-detected status as an output signal, (e) Sync count means for counting a value of symbols that corresponds to cycles of the Sync signal responding to the output signals from the Sync detection determination means and pattern check means, and outputting a timing signal when the count value reaches to a predetermined value, and the Sync signal detection device further comprises:

(f) Sync detection initialization means for receiving a switching signal that indicates an input signal is switched over, and then forcibly resetting the agreement detection count means as well as setting the disagreement detection count means at a predetermined value.

According to the present invention, when a signal is switched over, the Sync signal can be detected sooner than with the conventional device, while keeping the following protective function: when a Sync signal is missing due to noises or a lack of data, or the same pattern as that of a Sync signal appears abruptly in the data area by chance, malfunction is prevented.

The invention described in claim 1 of the present invention refers to a Sync signal detection circuit comprising:

(a) pattern check means, (b) agreement detection count means, (c) disagreement detection count means, (d) Sync detection determination means, and (e) Sync count means.

The Sync signal detection circuit further comprises Sync detection initialization means that functions as follow: When a signal of input data is switched over, the initialization means forcibly reset the agreement detection counter means as well as set the disagreement count means at a predetermined value responding to a switching signal so that the Sync detection determination means outputs a signal indicating the Sync non-detected status. This structure enables the Sync signal detection circuit to detect the Sync signal sooner than the conventional circuit while keeping the preventive function that prevents the malfunction of detecting Sync signals.

The invention described in claim 2 of the present invention refers to a Sync signal detection circuit comprising:

(a) pattern check means, (b) first agreement detection count means, (c) disagreement detection count means, (d) Sync detection determination means, and (e) first Sync count means for outputting a first timing signal.

The Sync signal detection circuit further comprises the following element:

(f) priority output means comprising:

(f-1) second Sync count means for receiving the output signals from the pattern check means, Sync detection determination means and disagreement detection count means, counting values of symbols that correspond to a cycle of a Sync signal responsive to these signals, and outputting second timing signals when the count values reach to predetermined values, (f-2) second agreement detection count means for counting a value of pattern agreement cases where the reference pattern agrees with the pattern of Sync signal, in response to the output signals from the pattern check means and the second Sync count means, and outputting information of the counted value as an output signal, and (f-3) OR gate means for gating the output signals of the first agreement detection count means and the output signal of the second agreement detection count means.

According to this structure, when a signal of input data system is switched over, the circuit starts checking patterns of Sync signals responding to the switching signal. When the checked pattern agrees with the reference pattern more than one time, the Sync detection signal indicating Sync detected status is given priority and tapped off from the circuit. This structure enables the circuit to detect Sync signals sooner than the conventional circuit does when a signal is switched over, while maintaining the preventive function, i.e., preventing the malfunction of Sync signal detection when a Sync signal is missing due to noises or a lack of data, or when the same pattern as that of the Sync signal appears in the data area abruptly by chance. Further, this circuit can automatically responds to the signal switch-over without being given a signal indicating that a signal is to be switched.

EXEMPLARY EMBODIMENTS OF THE PRESENT INVENTION

Figure 1:
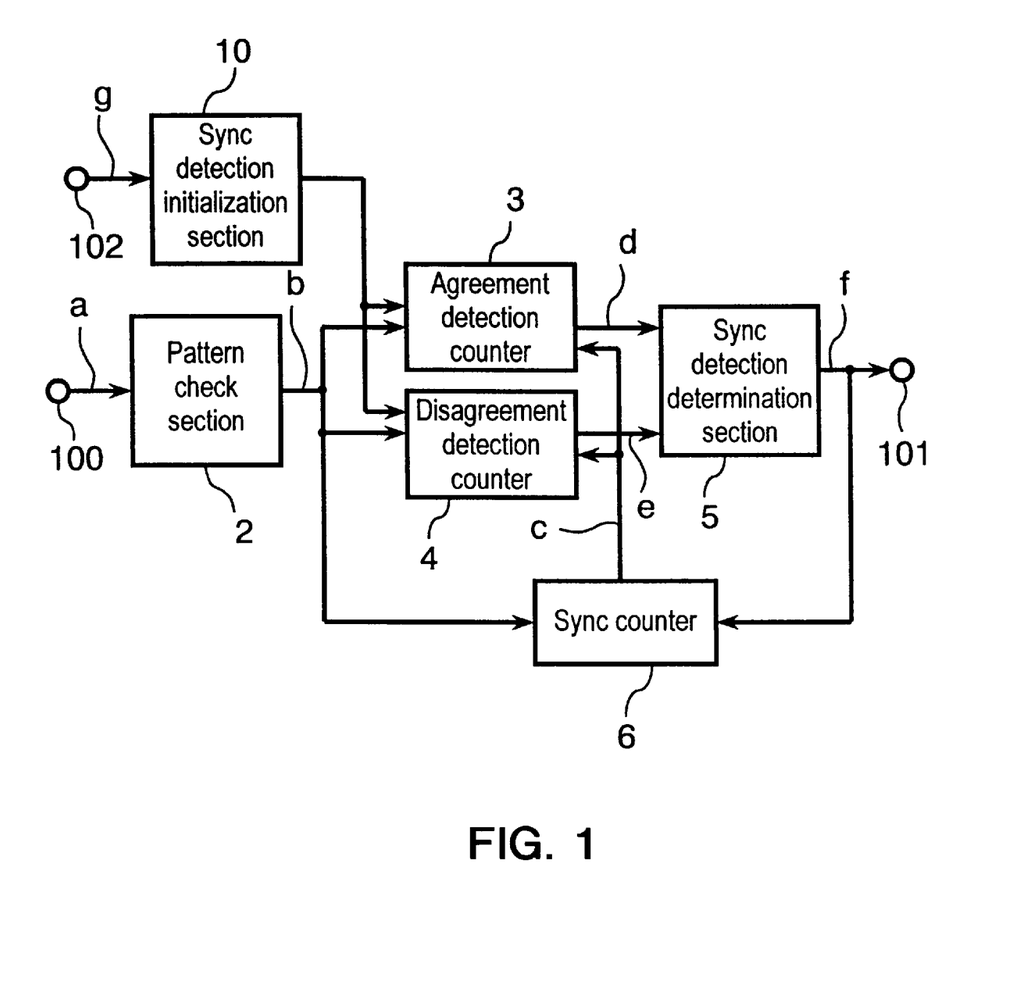
FIG. 1 is a block diagram depicting a Sync signal detection circuit used in the first exemplary embodiment of the present invention.

FIG. 1 is a block diagram depicting a Sync signal detection circuit used in the first exemplary embodiment of the present invention, and the corresponding sections to the block diagram depicting a prior art shown in FIG. 8 are designated with the same numbers.

In FIG. 1, a digital signal "a" according to the VSB transmission format is fed into an input terminal 100. A Sync signal included in this digital signal "a" is checked in a pattern check section with a reference pattern whether it agrees with the Sync signal pattern or not. If the reference pattern agrees with that of the Sync signal, the pattern check section 2 outputs a high level signal "b", and supplies the signal "b" to an agreement detection counter 3, a disagreement detection counter 4 and a Sync counter 6.

A Sync detection determination section 5 determines a Sync detection based on both of output signals (d and e) that contain the count values of the counters 3 and 4.

The block diagram depicting the above operation is the same that shown in FIG. 8, of which detailed operation and function were already described, they are thus omitted here.

Exemplary Embodiment 1

The first exemplary embodiment of the present invention (FIG. 1) has an additional structure to the conventional circuit, i.e., a switching signal "g" is fed into the Sync detection initialization section 10 via an input terminal 102. In other words, when an input signal is switched over to another signal by a receiver switch (not shown), the signal "g" indicating this signal switching is fed into the input terminal 102 and then supplied to the Sync detection initialization section 10.

When receiving this switching signal "g", the initialization section 10 is so structured to forcibly set the agreement detection counter 3 to "0" as well as the disagreement counter 4 to "3".

Figure 2:
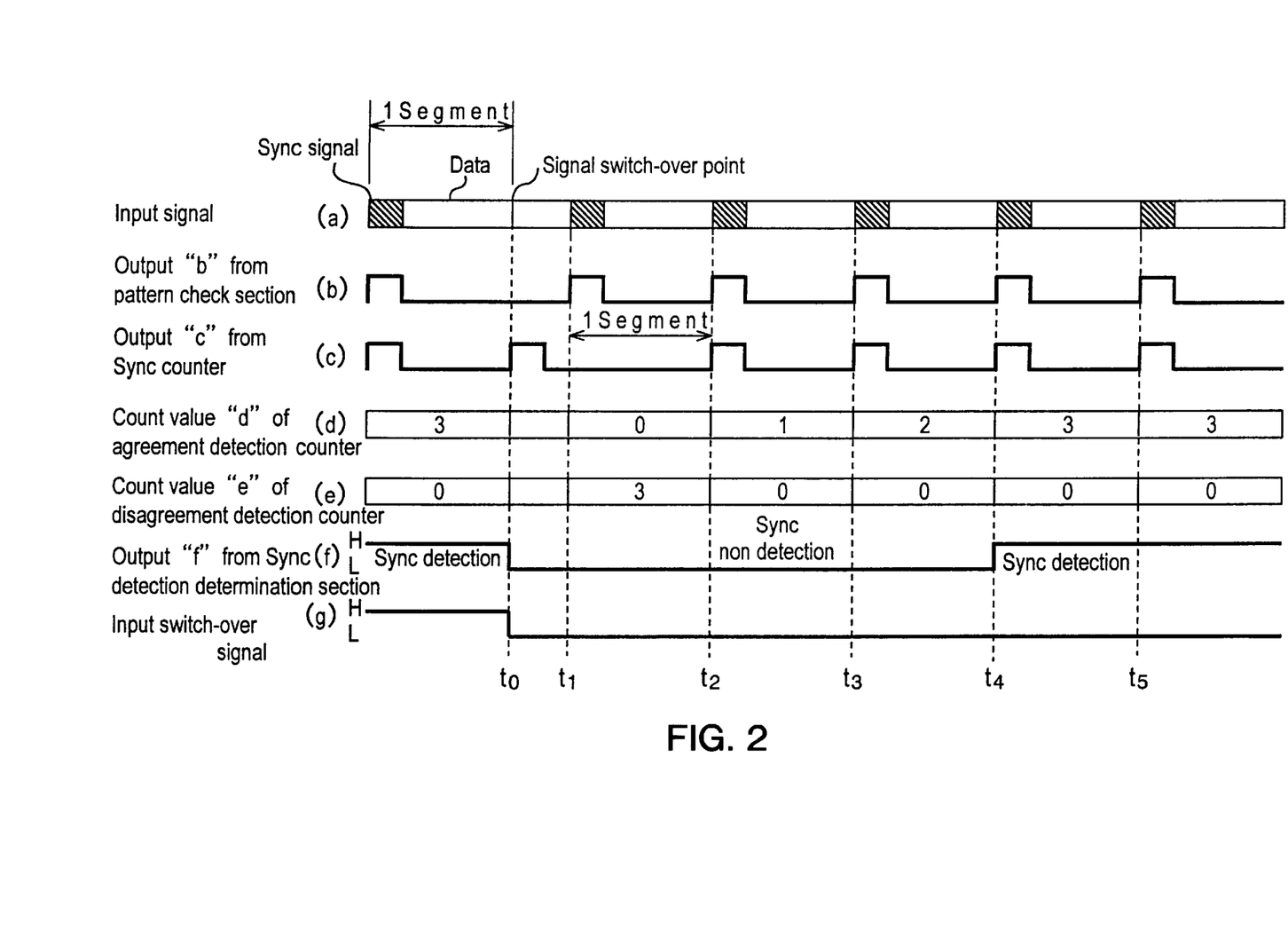
FIG. 2 is a timing chart depicting a detecting operation of the Sync signal detection circuit shown in FIG. 1.

The timing chart shown in FIG. 2. describes how to detect Sync signals with the Sync signal detection circuit shown in FIG. 1.

In FIG. 2, before a signal is switched over (before the time=t 0), the Sync detection determination section 5 outputs a high level signal "f" indicating Sync detected status. The Sync counter 6 thus keeps outputting high level timing signals "c" for a period of 4 symbols to the agreement detection counter 3 and disagreement detection counter 4 every time after one segment period (=832 symbols) passes. And yet, at this stage, the counter 3 indicates "3" and counter 4 indicates "0". (refer to (d) and (e) in FIG. 2 (d)).

In this situation, when another signal takes over the above signal through a receiver switch or the like (time=t 0), a low level switching signal "g" is fed into the second input terminal 102 responding to this signal switch-over (refer to (g) in FIG. 2) and supplied to the Sync detection initialization section 10.

When receiving the switching signal "g" through the second input terminal 102, the initialization section 10 forcibly sets the counter 3 to "0" as well as the counter 4 to "3" (refer to (d) and (e) in FIG. 2).

These counted values are given to the Sync detection determination section 5, then the section 5 outputs the low level signal "f" indicating Sync non-detected status when the output signal "e" of the counter 4 just changes to "3" (time=t 0) while the counter 3 outputs the signal "d" at "0" (refer to (f) in FIG. 2).

When the output signal "f" from the determination section 5 turns to the low level indicating Sync non-detected status, the Sync counter 6 outputs high level timing signals "c" upon receiving an output signal "b" from the pattern check section 2 to the counters 3 and 4 sequentially for the period of 4 symbols every time one segment period (=832 symbols) passes.

For instance, the timing signal "c" at the time=t2 is produced after one segment period from the output signal "b" tapped off at the time=t1 from the pattern check section 2 because the output signal "f" indicates Sync non-detected status (=low level).

As such, when the output signal "b" stays at the high level every time a timing signal "c" is given (time=t2, t3, and t4), the agreement detection counter 3 counts up one by one. When it reaches to "3", the count value "d" is held at "3" at the time=t5 and onward. When the output signal "b" stays at the high level every time the timing signal "c" is given (time=t2, t3 and t4), the disagreement detection counter 4 is reset to "0" upon receiving the timing signal "c". Then the Sync detection determination section 5 outputs a high level signal indicating Sync detected status when the counter 3 counts "3" and the counter 4 counts "0" (time=t4) (refer to (f) in FIG. 2).

Other operations are the same that of the conventional circuit shown in FIG. 8, the details are thus omitted here.

In the conventional Sync signal detection circuit shown in FIG. 8, a segment Sync signal must be given as many as six times from the switch over of the input signal (time=t 0) until the output from the determination section 5 is restored to Sync detected status. However, according to the first exemplary embodiment of the present invention, when the segment Sync signal is given four times (times=t1, t2, t3 and t4), the output is restored to Sync detection status, as a result, the time for detecting the Sync signal can be shortened.

In the Sync signal detection circuit shown in FIG. 1 used in the first exemplary embodiment, when the switching signal "g" is not fed through the second input terminal 102, accordingly, the counters 3 and 4 are not initialized by the Sync detection initialization section 10, the circuit works same as the conventional circuit in FIG. 8. Therefore, when a Sync signal is missing due to noises or a lack of data, or the same pattern that of the Sync signal appears abruptly in the data area, malfunctions can be prevented by the preventive function described above with reference to FIGS. 11 and 12.

Exemplary Embodiment 2

Figure 3:
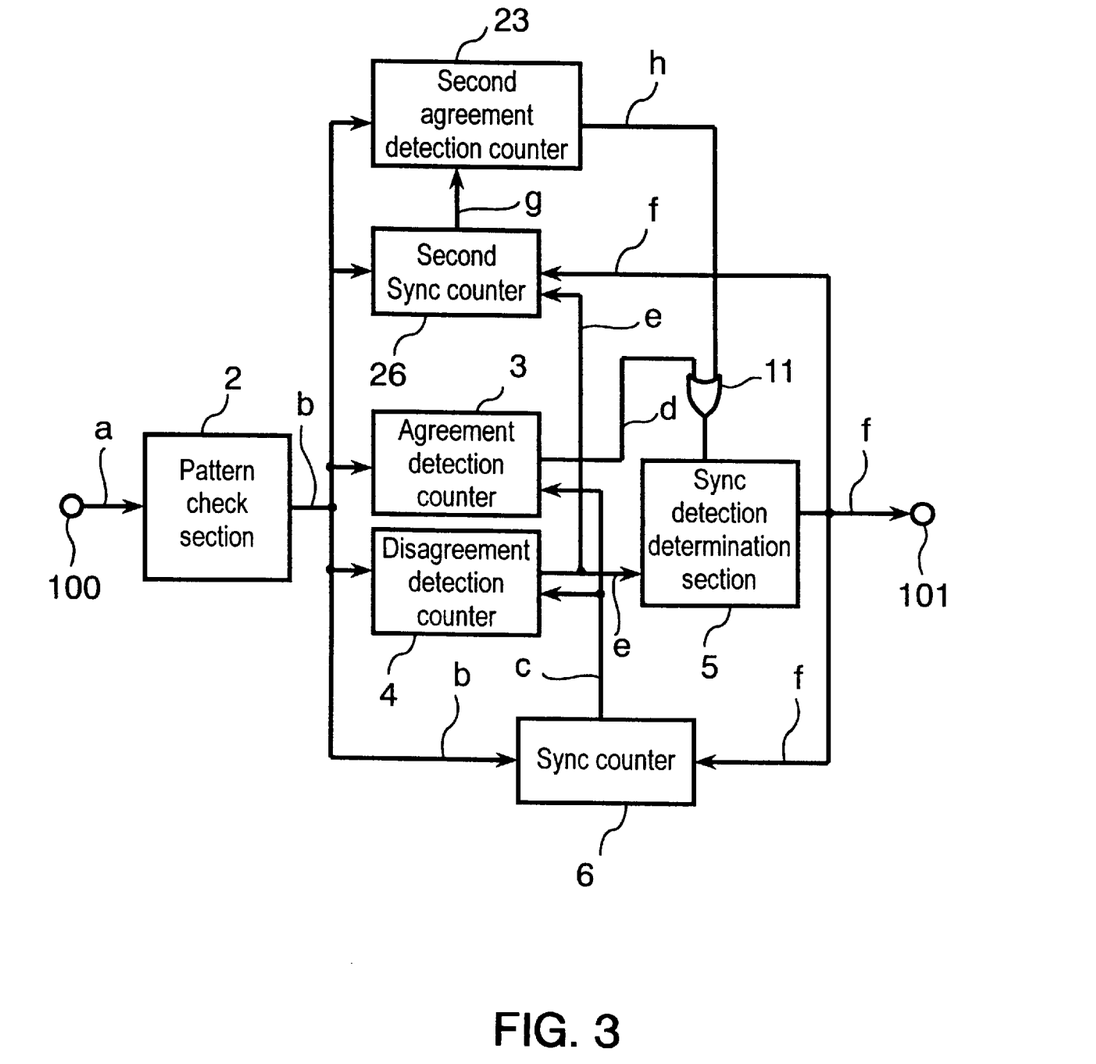
FIG. 3 is a block diagram depicting a Sync signal detection circuit used in the second exemplary embodiment of the present invention.

The second exemplary embodiment is described by referring to FIG. 3 that is a block diagram depicting the Sync signal detection circuit utilized in this embodiment. The corresponding sections to those in FIG. 8 showing the prior art are designated with the same numbers.

In FIG. 3, the following elements are the same as those in FIG. 8, the detailed descriptions thereof are thus omitted here.

This second exemplary embodiment has priority output means in addition to the same elements as the conventional circuit. The priority output means comprises the following elements: (a) a second agreement detection counter 23 coupled to the pattern check section 2, (b) a second Sync counter 26, and (c) an OR gate 11 for the output signal "d" from the agreement detection counter 3 and the output signal "h" from the second agreement detection counter 23.

When receiving a timing signal "g" tapped off from the second Sync counter 26, the second agreement detection counter 23 counts up one by one provided the output signal "b" from the pattern check section 2 is at the high level. When the count value reaches to "3", the counter 23 does not count up any more and keeps "3" even the output signal "b" is at the high level. When the output signal "b" is on low level, the counter 23 is reset to "0".

When the disagreement counter 4 taps off the output signal "e" as "0" and at the same time the Sync detection determination section 5 taps off the output signal "f" at a high level indicating Sync detected status, the second Sync counter 26 starts counting at the time when signal "f" turns to the high level. The counter 26 outputs high level timing signals "g" for a period of 4 symbols every time a period of one segment (=832 symbols) passes. When the output signal "e" from the counter 4 takes other values (i.e., "1", "2", "3") than "0", the second Sync counter 26 starts counting upon receiving each output signal "b" from the pattern check section 2 responding to a rising edge of the signal "b", and the counter 26 outputs high level timing signal "g" for the period of 4 symbols every time one segment period (=832 symbols) passes. Further, when the output signal "e" from the counter 4 takes values other than "0", the second Sync counter 26 does not output the timing signal "g" even receiving the output signal "b" from the pattern check section 2 before the one segment period (=832 symbols) passes.

The output signal of OR gate 11 for the output signal "h" of the counter 23 and the output signal "d" of the counter 3 is supplied to the Sync detection determination section 5. Other elements are the same as those in the prior art shown in FIG. 8, the detailed descriptions thereof are thus omitted here.

Figure 4:
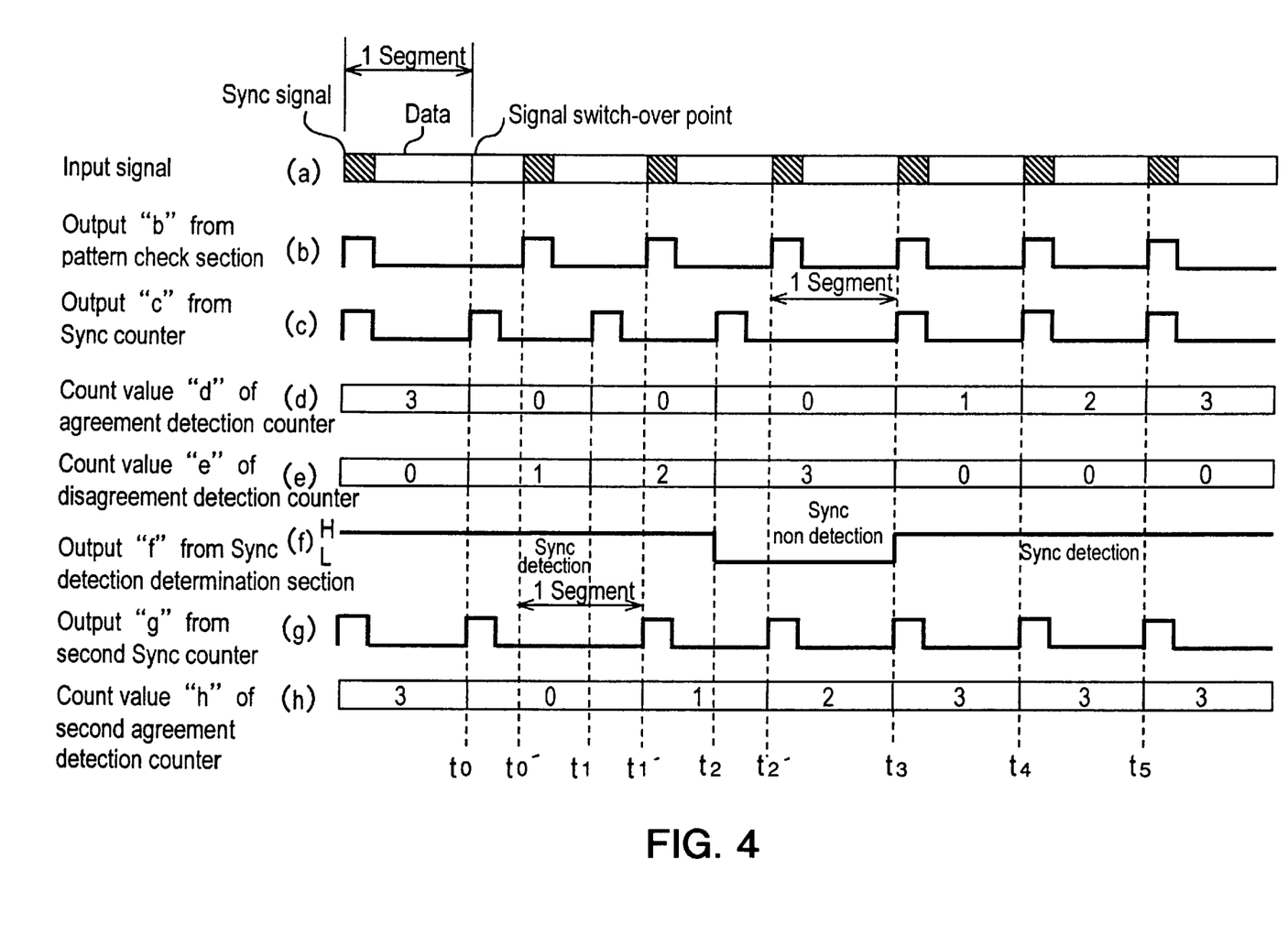
FIG. 4 is a timing chart depicting a detecting operation of the Sync signal detection circuit shown in FIG. 2.

An operation of the Sync signal detection circuit utilized in the second exemplary embodiment is described by referring to the timing chart shown in FIG. 4.

In FIG. 4, before a data signal is switched over (before the time=t 0), the Sync detection determination section 5 outputs a high level signal "f" indicating Sync detected status. Since when the signal "f" has turned to high level (=Sync detected status), the Sync counter 6 thus keeps outputting high level timing signals "c" for a period of 4 symbols to the agreement detection counter 3 and disagreement detection counter 4 every time after one segment period (=832 symbols) passes. (Refer to (c) in FIG. 4). Therefore, the counter 3 keeps taking "3" and counter 4 indicates "0" (Refer to (d) and (e) before time=t0.)

As previously described, when the counter 4 takes "0" and the Sync detection determination section 5 outputs high level signals "f" indicating Sync detected status, the second Sync counter 26, upon the signal "f" turning to the high level, keeps outputting high level timing signals "g" to the second agreement detection counter 23 for a period of 4 symbols every time the one segment period (=832 symbols) passes. The counter 23 thus holds the count value at "3". (Refer to (h) before time=t 0 in FIG. 4(h).)

At this stage, when an input signal is switched over to another input signal by a receiver's switch or the like (not shown) at the time=t 0, an output period of the signal "b" from the pattern check section 2 becomes longer or shorter than the one segment period (=832 symbols) because both phases of these two input signals seldom agree with each other, rather they do not agree in general. The output signal "b" from the pattern check section 2 stays thus at low level (refer to (b) in FIG. 4), when the Sync counter 6 taps off the timing signal "c" (at the time=t 0). Therefore, the agreement counter 3 is reset while the disagreement counter 4 counts "1". At the times=t 1 and t 2 when both counters 3 and 4 receive the timing signals "c" after the time=t 0, the output signal "b" from the pattern check counter 2 is at the low level. The disagreement counter 4 counts up one by one and holds the count value at "3" even if the counter would further counts. (Refer to (e) in FIG. 4.)

The Sync detection determination section 5 outputs a low level signal "f" indicating Sync non-detected status just when the output signal "e" from the counter 4 turns to "3" (the time=t 2) while the output signal "d" from the counter 3 takes "0". (Refer to (f) in FIG. 4.)

On the other hand, the counter 26 starts counting upon receiving each output signal "b" from the pattern check section 2 responding to a rising edge of the signal "b," and outputs high level timing signals "g," for a period of 4 symbols every time a period of one segment (=832 symbols) passes, to the second agreement detection counter 23, when the output signal "e" from the counter 4 takes other values (in this embodiment, the count value is "1") than "0" (time=t 0.)

For instance, since a count value "e" of the counter 4 is "1" (=other than "0") at the time=t 0, the second Sync counter 26 starts counting from a rising edge of the output signal "b" produced at time=t 0', and the timing signal "g" is produced after one segment period (=832 symbols) passes (time=t 1'.) (Refer to (g) in FIG. 4.)

When receiving the timing signal "g" from the counter 26 (time=t 0), the second agreement counter 23 resets its count value to "0" provided the output signal "b" from the pattern check counter 2 is at the low level. When 10 receiving the next timing signal "g" (time=t 1'), the count value "h" of the counter 23 goes up to "1" provided the output signal is at the high level. After this, the counter 23 counts up one by one (time=t 2', t 3) and when the count value reaches to "3", the counter does not count up any more and keeps "3" even if the output signal "b" is at the high level (time=t 4, t 5.) (Refer to (h) in FIG. 4.)

When the count value of counter 23 reaches to "3" (time=t 3,) the counter value (d) of counter 3 is "1" and that (=e) of the counter 4 is "0". However, the Sync detection determination section 5 outputs the high level signal "f" indicating Sync detected status because the count value "3" from the counter 23 is fed via the OR gate 11 as well as the count value "0" from the counter 4 to the section 5. (Refer to (f) in FIG. 4.)

As such, this second exemplary embodiment proves that Sync signal detection circuit of the present invention is restored to Sync detected status when the segment Sync signals are given four times (times=t 0', t 1', t 2'and t 3' as shown (a) in FIG. 4) whereby the time necessary for detecting a Sync signal is shortened, while the conventional circuit requires 6 times input of the segment Sync signals since when an input signal is switched over until an output from the Sync detection determination section 5 indicates the Sync detected status again as shown in FIG. 8.

The following protective function is still secured in the Sync signal detection circuit shown in FIG. 3 and utilized in this second exemplary embodiment: malfunction due to missing of Sync signals due to noises or a lack of data, and malfunction due to an abrupt appearance of the same pattern as that of a Sync signal in the data area. This is described by referring to the timing charts shown in FIGS. 5 and 6.

Figure 5:
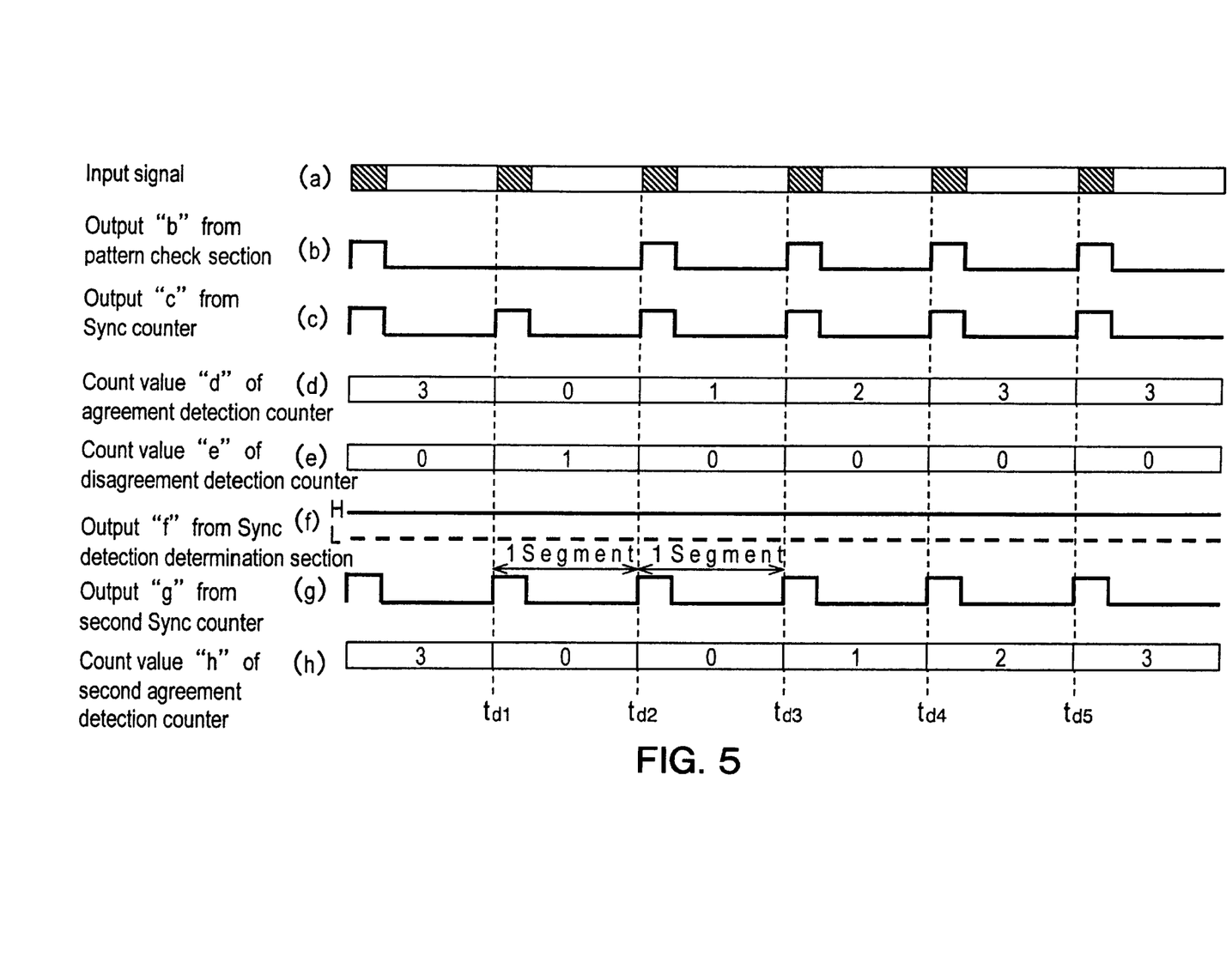
FIG. 5 is a timing chart depicting a preventive function against the malfunction of the Sync signal detection circuit shown in FIG. 3.

FIG. 5 depicts a case where the circuit is in the Sync detected status (i.e., a count value of the agreement detection counter 3 indicates "3" and that (=e) of the disagreement detection counter 4 indicates "0", and the Sync detection determination section 5 outputs a high level signal "f" ), and a Sync signal pattern included in an input signal "a" is temporarily distorted (at the time=t d1) by a disturbance such as noises or the like.

At this time (=t d1), the pattern check section 2 does not output a pulse of four symbols period at the high level that indicates Sync detected status, and the output signal "b" stays at the low level. In this case, when the Sync counter 6 outputs the timing signal "c", the counter 3 is reset to "0" and the counter 4 indicates "1". Further, when the second Sync counter 26 outputs the timing signal "g", the second agreement detection counter 26 is reset to "0" because the output signal "b" from the pattern check section 2 stays at the low level.

However, the disturbances such as noises and the like happen abruptly and do not last. Therefore, if the Sync signals to be received after the next timing (=t d2) are normal, the pattern check section 2 outputs the high level pulse(=four symbols period) signals "b" indicating Sync detected status. Thus after the time=t d2, the counter counts up one by one from "1" while the counter 4 is reset to "0" (Refer to (d) and (e) in FIG. 5.)

When the output "e" from the counter 4 is "1" at the time=t d1, the pattern check section 2 does not output "b", therefore, the second Sync counter 26 does not tap off the timing signal "g" at the time=t d2. The output signal "h" from the second agreement detection counter 23 thus stays at "0". After the time=t d3, the second Sync counter 26 outputs the timing signal "g" every time one segment period passes, thereby the counter 23 counts up one by one.

Accordingly, the Sync signal detection circuit of the present invention shown in FIG. 3 can prevent a malfunction, i.e., if a Sync signal is temporarily distorted due to noises or the like, the circuit does not instantly turn to Sync non-detected status (=low level) but it maintains the high level indicating Sync detected status, the malfunction is thus prevented.

Figure 6:
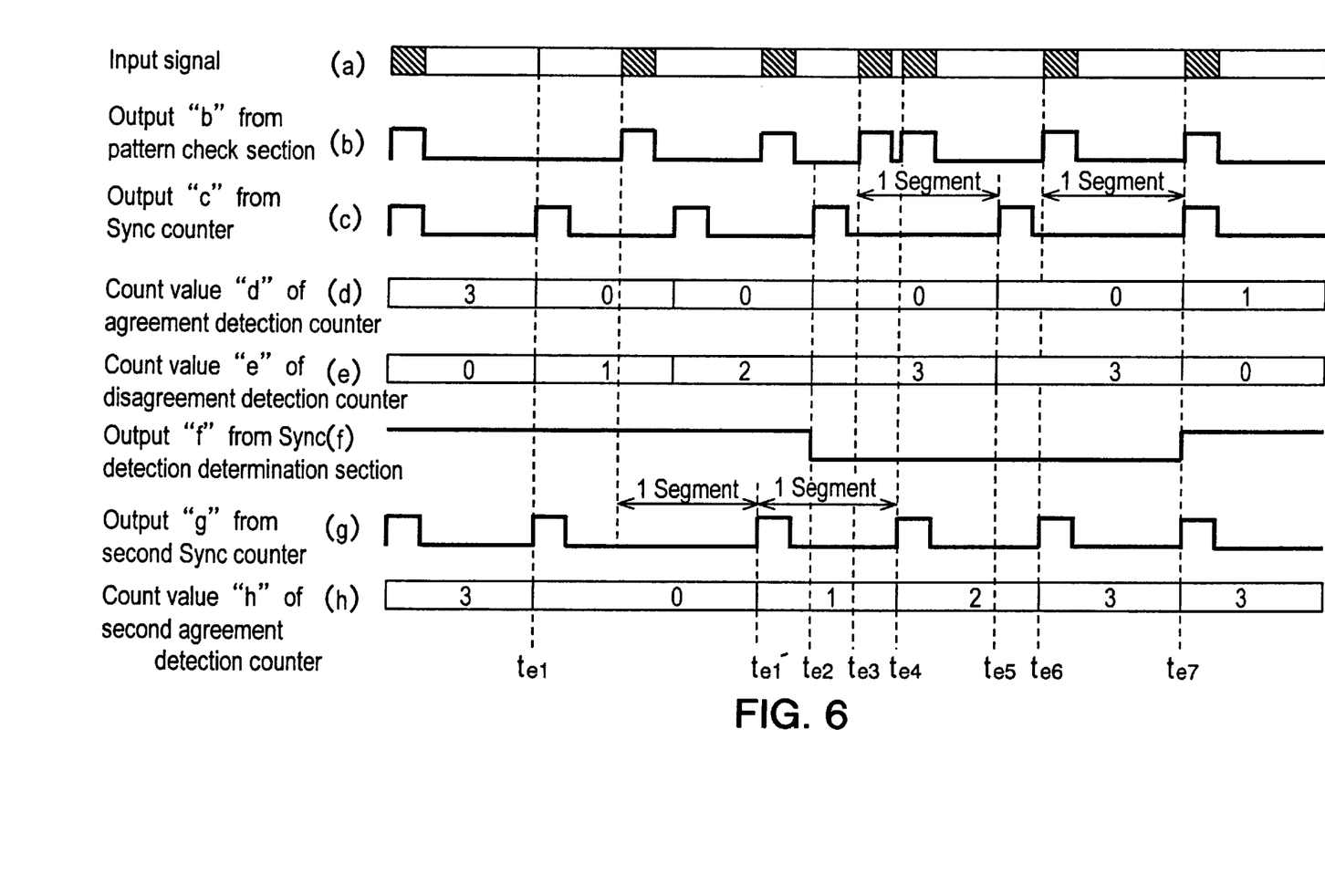
FIG. 6 is a timing chart depicting a preventive function against the malfunction of the Sync signal detection circuit shown in FIG. 3.

FIG. 6 depicts a similar situation to FIG. 4, i.e., for instance, a signal is switched over at the time=t e1, and after the time=t e3 when the Sync detection determination section 5 is ready to output a low level signal indicating Sync non-detected status (the output signal "d" from the agreement detection counter 3 is "0", and the output signal "e" from the disagreement detection counter 4 is "3"), further at the time=t e3, the same pattern as that of a Sync signal appears by chance in the data area.

At this time (=t e3), the pattern check section 2 outputs a high level signal "b" indicating a pattern agreement, then the Sync counter 6 outputs the timing signal "c" responsive to the signal "b" after one segment period (=832 symbols) passes (time=t e5). Meanwhile, the output signal "b" from the pattern check section 2 is fed into the Sync counter 6 between t e3 and t e5 (time=t e4), however, the Sync counter 6 neglects this signal "b" as described previously.

When the timing signal "c" is tapped off from the Sync counter 6 at t e5, the counter 3 indicates "0" and the counter 4 indicates "3" because the pattern check section 2 outputs the low level signal "b".

The second Sync counter 26 outputs the timing signal "g" after one segment period passes every time the output signal "b" from the pattern check section 2 is given, except when the output signal "e" from the counter 4 is "0". (e.g., in FIG. 6, the times=t e1', t e4, t e6, t e7 . . . ) Meanwhile, the output signal "b" (this is an output signal in the data area and having the same pattern as that of a Sync signal) is fed into the second Sync counter 26 at the time=t e3 (between t e1' and t e4). The second Sync counter 26 neglects this output signal "b" as mentioned previously.

Therefore, when the same pattern as that of a Sync signal appears abruptly in the data area, the circuit does not turns to Sync detected status but keeps outputting the low level signal indicating Sync non-detected status. The malfunction is thus prevented.

Industrial Applicability

In the digital signal transmission such as a digital television broadcasting, the present invention proves that a Sync signal can be detected in a shorter period than the conventional circuits, further, there is no need to give an indication signal that indicates the signal is to be switched over, to the circuit of the present invention. Thus the circuit of the present invention can detect a Sync signal automatically within a shorter period, which gives a great advantage to the practical use of the digital signal transmission. The present invention also preserves the preventive function against the malfunction. That is when a Sync signal included in transmitted signals is missing due to noises or a lack of data, or the same pattern as that of a Sync signal appears abruptly in the data area, the circuit mistakenly detects a Sync signal.

What is claimed is:

1. A synchronizing signal detection device comprising:
 (a) pattern check means for checking a signal pattern of a synchronizing (Sync) signal included in television signals transmitted in digital mode with a predetermined reference pattern, and outputting a check result as an output signal, (b) agreement detection count means for receiving the output from said pattern check means, counting a value of agreement cases where the reference pattern agrees with the pattern of Sync signal, and outputting information of counted values as an output signal, (c) disagreement detection count means for receiving the output signal from said pattern check means, counting a value of disagreement cases where the reference pattern disagrees with the pattern of Sync signal, and outputting information of counted values as an output signal, (d) Sync detection determination means for determining a detection of said Sync signal based on the output signals from said agreement detection count means and said disagreement detection count means, and outputting information whether the Sync signal is detected or not, (e) Sync count means for counting a value of symbols which correspond to cycles of said Sync signal in response to the output signals from said Sync detection determination means and from said pattern check means, outputting a timing signal when the counted value reaches to a predetermined value, wherein, said Sync signal detection device further comprises Sync detection initialization means having such functions as:

receiving a switch-over signal at an input terminal, said switch-over signal indicating that an input signal to be received is switched, coupling an output terminal to said agreement detection count means with said disagreement detection count means, resetting forcibly the counted value of said agreement detection count means when said switch-over signal is given, and setting forcibly the counted value of said disagreement detection count means at a predetermined value.

2. A synchronizing signal detection device comprising:

(a) pattern check means for checking a signal pattern of a synchronizing (Sync) signal included in television signals transmitted in digital mode with a predetermined reference pattern, and outputting a check result as an output signal, (b) first agreement detection count means for receiving the output from said pattern check means, counting a value of agreement cases where the reference pattern agrees with the pattern of Sync signal, and outputting information of counted values as an output signal, (c) disagreement detection count means for receiving the output signal from said pattern check means, counting a value of disagreement cases where the reference pattern disagrees with the pattern of Sync signal, and outputting information of counted values as an output signal, (d) Sync detection determination means for determining a detection of said Sync signal based on the output signals from said first agreement detection count means and said disagreement detection count means, and outputting information whether the Sync signal is detected or not, (e) first Sync count means for counting a value of symbols which correspond to a cycle of said Sync signal in response to the output signals from said Sync detection determination means and from said pattern check means, outputting a first timing signal when the counted value reaches to a predetermined value, wherein, said Sync signal detection device further comprises:

(f) priority output means comprising:

(f-1) second Sync count means having such functions as:

receiving the output signals from said pattern check means, said Sync detection determination means and said disagreement detection count means, counting a value of symbols which correspond to cycles of said Sync signal in response to the output signals from said pattern check means, said Sync detection determination means and said disagreement detection count means, and outputting a second timing signal when the counted value reaches to a predetermined value, (f-2) second agreement detection count means for counting a value of pattern agreement cases where the reference pattern agrees with the pattern of Sync signal, in response to the output signals from said pattern check means and said second Sync count means, and outputting information of the counted value as an output signal, and (f-3) OR gate means for gating the output signal of said first agreement detection count means and the output signal of second agreement detection count means, said priority output means being coupling to said Sync detection determination means.

* * * * *